United States Patent [19]

Ohde et al.

[11] Patent Number: 5,056,004
[45] Date of Patent: Oct. 8, 1991

[54] PROGRAM CONTROL SYSTEM WHICH SIMULTANEOUSLY EXECUTES A PROGRAM TO BE REPEATED AND DECREMENTS REPETITION NUMBERS

[75] Inventors: Yuko Ohde; Hideo Tanaka; Ichiro Kuroda, all of Tokyo, Japan

[73] Assignee: NEC Corporation, Tokyo, Japan

[21] Appl. No.: 258,082

[22] Filed: Oct. 14, 1988

Related U.S. Application Data

[63] Continuation of Ser. No. 10,499, Feb. 3, 1987, abandoned.

[30] Foreign Application Priority Data

Feb. 3, 1986 [JP] Japan .................................. 61-22267

[51] Int. Cl.⁵ .......................... G06F 9/06; G06F 9/22; G06F 9/306; G06F 9/40
[52] U.S. Cl. .......................... 264/200; 364/231; 364/232.8; 364/251.3; 364/261.3; 364/261.7; 364/262.1; 364/243.3; 364/262; 364/946.2; 364/946.6; 364/946.8; 364/948; 364/949.1
[58] Field of Search ... 364/200 MS File, 900 MS File

[56] References Cited

U.S. PATENT DOCUMENTS

| | | |
|---|---|---|
| 3,736,567 | 5/1973 | Lotan et al. ........................ 364/200 |
| 3,736,567 | 5/1973 | Lotan ................................. 364/200 |
| 4,097,920 | 6/1978 | Ozga ................................. 364/200 |
| 4,118,776 | 10/1978 | Isomura ............................ 364/200 |
| 4,323,964 | 4/1982 | Gruner .............................. 364/200 |
| 4,404,625 | 9/1983 | Saito et al. ...................... 364/900 |
| 4,430,711 | 2/1984 | Anderson et al. ................ 364/200 |
| 4,438,492 | 3/1984 | Harmon, Jr. et al. ............ 364/200 |
| 4,463,422 | 7/1984 | Stoner et al. .................... 364/300 |
| 4,556,938 | 12/1985 | Parker et al. .................... 364/200 |
| 4,723,258 | 2/1988 | Tanaka ............................. 377/111 |
| 4,727,483 | 2/1988 | Saxe ................................. 364/200 |
| 4,882,701 | 11/1989 | Ishii ................................. 364/900 |

Primary Examiner—Archie E. Williams, Jr.
Assistant Examiner—Ayni Mohamed
Attorney, Agent, or Firm—Foley & Lardner

[57] ABSTRACT

A for controlling a includes circuit a register for holding the repetition number of a program operation to be repeated, a counter receiving the content of the register and adapted to decrement in response with each execution of the program operation to be repeated, a memory for storing a sequence of instructions, and a controller for receiving an instruction read from the memory modification in a normal condition and to convert the received instruction into a no-operation instruction when the content of the counter becomes a predetermined content.

7 Claims, 5 Drawing Sheets

PROGRAM CONTROL SYSTEM WHICH SIMULTANEOUSLY EXECUTES A PROGRAM TO BE REPEATED AND DECREMENTS REPETITION NUMBERS

This application is a continuation of application Ser. No. 010,499, filed Feb. 3, 1987, now abandoned.

BACKGROUND OF THE INVENTION

1. Field of the Invention

The present invention relates to a program control circuit for use in a program controlled apparatus such as a microcomputer.

2. Description of Related Art

The advancement of integrated circuit technology has made it possible to assemble a considerably complicated logic circuit in a single chip of an integrated circuit. Such an integrated circuit can be exemplified by a single chip microcomputer, which has in turn become very complicated and diversified because of the complication of logic circuits which can be realized in an integrated circuit chip.

On the other hand, microcomputers are adapted to execute programs read from an internal memory or an external memory. In such a program controlled computer, how short and how clean a program is described is very significant to the high speed processing of data.

One typical example of an operation which requires a short and clean program is a numerical data processing, which requires a solution having a high degree of precision. For the purpose of elevating the precision of a solution, it is an ordinary practice to repeatedly execute the same processing. In this case, if the same program to be repeatedly executed is continuously described at the times corresponding to the number of repetitions, a short and simple program cannot be obtained. At present, therefore, there has been actually widely used such a method as to combine a processing program to be repeated and a conditional jump instruction so as to shorten a program to be prepared.

For example, the number of repetitions "N" of an operation program to be repeatedly executed is set in a register, and the operation program is repeatedly executed while decrementing the value held in the register by "1" after each one execution of the operation program. Then, when the value held in the register becomes "0", the repeated execution of the operation program is completed, and the next processing will be executed.

In the above mentioned repeated program execution, however, each time the operation program to be repeatedly executed is executed, not only the value held in the register must be decremented, but also, a discrimination must be made as to whether or not the value of the decremented register fulfills a given condition. This is done, so that a determination is made on the basis of the discrimination as to whether the operation should be returned to the operation program to be repeatedly executed or whether it should go to the next program away from the operation program to be repeatedly executed. For discrimination on the content of the register, a logic circuit for discrimination should additionally be provided. Further, an instruction for executing the discrimination is required, and if the instruction is described in a program as one independent instruction, such a discrimination instruction must be executed the times some number of as the repetition number required for a repeated operation. Therefore, the larger the repetition number of the operation becomes, it follows that the time of the executions of the discrimination instruction increases, so that a total operation time of a program will inevitably become lengthy. In addition, if a repeated operation program contains therein another repeated operation subprogram, the time of the executions of discrimination instructions increases further, so that the number of program steps and a necessary processing time will become very large.

SUMMARY OF THE INVENTION

Accordingly, it is an object of the present invention to provide a program control circuit which has overcome the above mentioned drawbacks of the conventional repeated program operation.

Another object of the present invention is to provide a program control circuit which can execute a repeated program operation with a small number of program steps.

Still another object of the present invention is to provide a program control circuit which can simultaneously perform execution of a program operation to be repeated and the decrement of a set number for repetition of a program execution.

The above and other objects of the present invention are achieved in accordance with the present invention by a program control circuit which comprises a register for holding the repetition number of a program operation to be repeated, a units for modifying the content of the register in accordance with each execution of the program operation to be repeated, a memory for storing a plurality of instructions, and a for transferring an instruction read from in the memory to the instruction register in a normal condition and for modifying the instruction read from the memory into a different instruction when the content of the register becomes a predetermined content.

With the above arrangement, when the content of the register is not equal to the predetermined content, the content of the register is modified simultaneously with execution of the instruction stored in the instruction register. Namely, since the modification of the content of the register (i.e., increment or decrement of the register) and the program operation are concurrently carried out, the number of required program steps can be decreased by one in each repetition the program operation.

The above and other objects, features and advantages of the present invention will be apparent from the following description of preferred embodiments of the invention with reference to the accompanying drawings.

DESCRIPTION OF THE PREFERRED EMBODIMENTS

Figure 1:
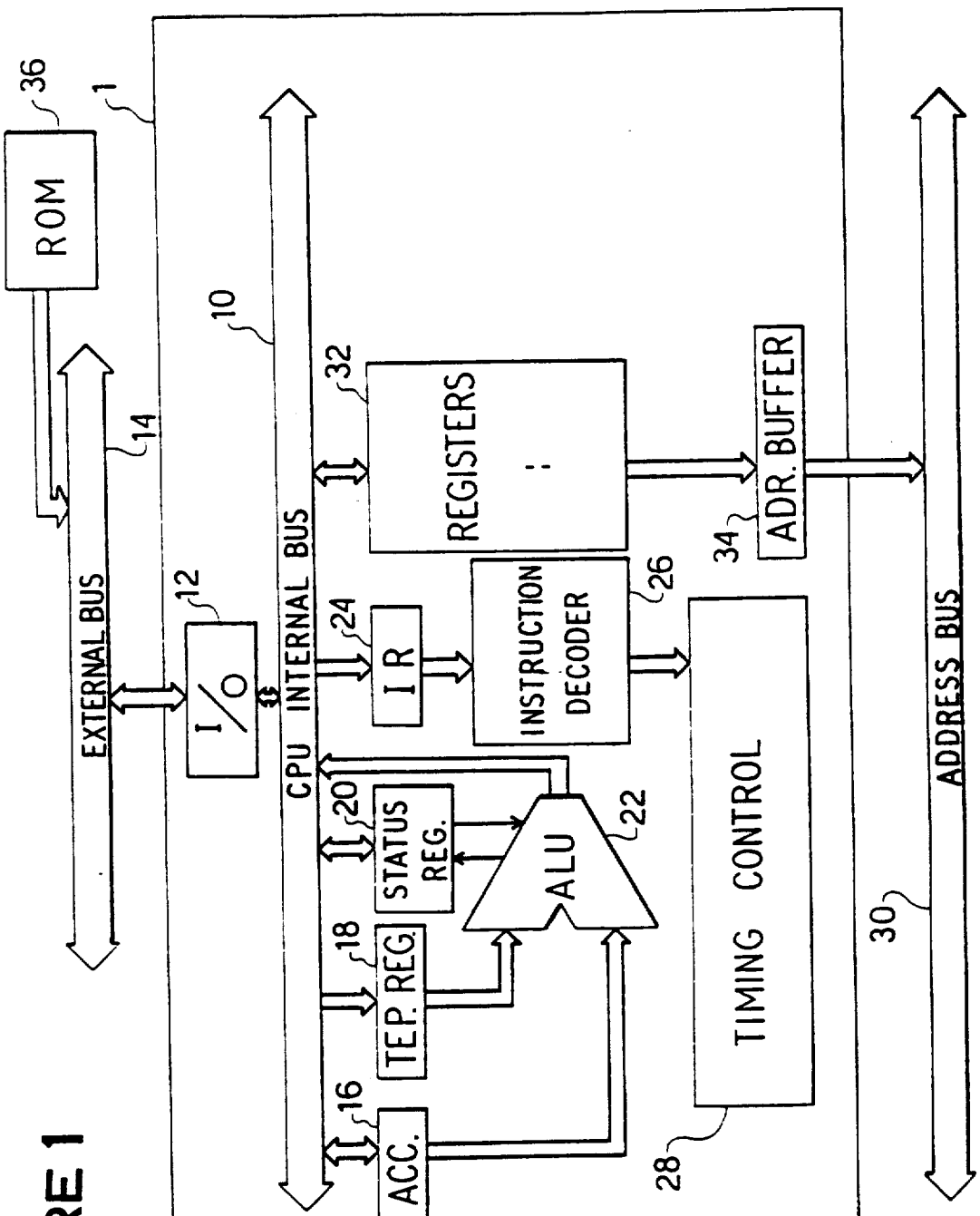
FIG. 1 is a block diagram of a processing unit which can incorporate therein the program control circuit in accordance with the present invention.

Referring to FIG. 1, there is shown one example of a processing unit of a microcomputer, which can incorporate therein the program control circuit in accordance with the present invention. The shown processing unit 1 includes a CPU internal bus 10 and an input/output (I/O) device 12 which are coupled between the CPU internal bus 10 and an external bus 14, which is coupled to an instruction read only memory (ROM) 36 of a microcomputer. Furthermore, the CPU internal bus 10 has coupled thereto an accumulator 16, a temporary register 18 and a status register 20. Outputs of the accumulator 16 and the temporary register 18 are coupled to inputs of an arithmetic and logic unit (ALU) 22 which is controlled by the status register 20. An output of the ALU 22 is coupled to the CPU internal bus 10. These elements (16 to 22) carry out the arithmetic logical processing.

The shown processing unit 1 also comprises an instruction register 24 having an input coupled to the CPU internal bus 10 and an output coupled to an input of an instruction decoder 26. The instruction decoder 26 supplies its output to a timing controller 28 for supplying and receiving various kinds of control signals. In addition, there is a group of registers 32 including a program counter, which register group is coupled between the CPU internal bus 10 and an address buffer 34 having an output coupled to an address bus 30 of the microcomputer.

In operation, the shown processing unit will operate in a manner similar to that of a conventional processing unit.

Briefly, the timing controller 28 generates timing signals and operates on the basis of the generated timing signals and various kinds of control signals received from the instruction decoder 26 so as to control the turn-on and turn-off of various gates (not shown) in the processing unit and at the same time to cause the address buffer 34 to supply the address and data onto the address bus 30. Also, the timing controller 26 operates to control transfer of various control signals between the I/O ports 30 and the external bus 14. On the other hand, the instruction is fed from the external bus 14 to the I/O device 12 and is written to the instruction register 24 through the CPU internal bus 10. The written instruction is decoded by the instruction decoder 26 and then furnished to the timing controller 28.

Figure 2:
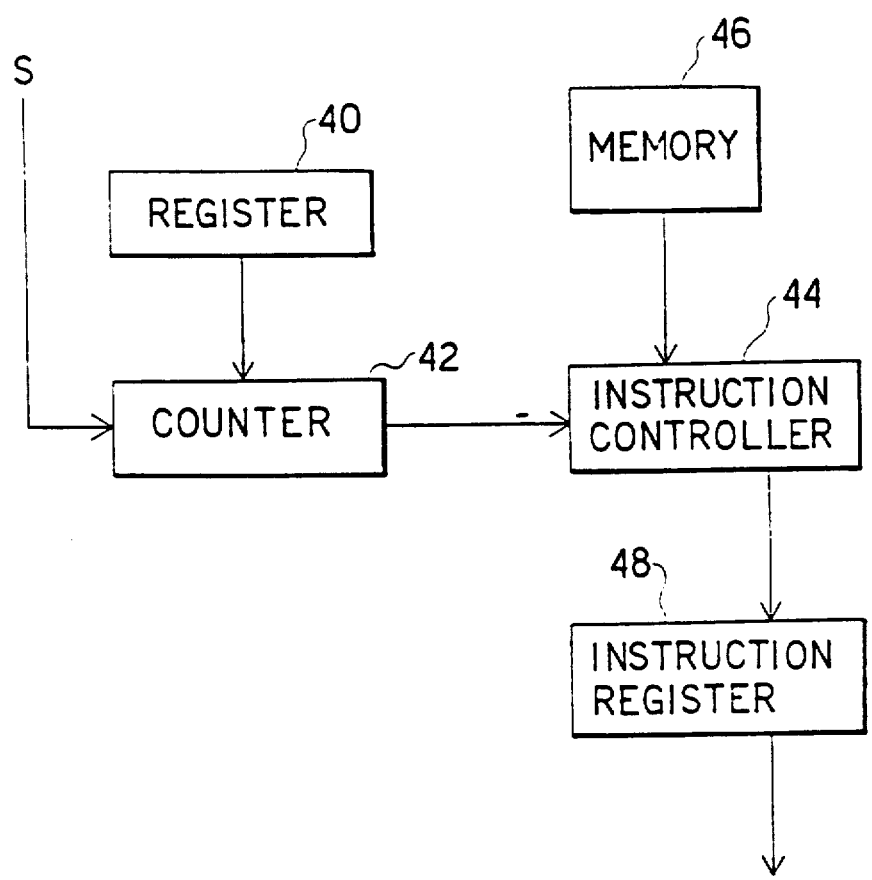
FIG. 2 is a block diagram of one embodiment of the program control circuit in accordance with the present invention.

Turning to FIG. 2, there is shown one embodiment of the program control circuit in accordance with the present invention, which can be located between the internal bus 10 and the instruction register 24 or the I/O device 12 in the processing unit shown in FIG. 1. The shown program control circuit comprises a register 40 adapted to be stored with information necessary for program control, such as the repetition number of a program operation to be repeatedly executed. A content of the register 40 is sent to a counter 42, which is in turn decremented or incremented in response to a signal S. When the counter 42 is of the count-down type it will generate a borrow signal to an instruction controller 44. When the counter 42 is of the count-up type, it will generate a carry signal to the instruction controller 44. This instruction controller 44 is coupled to a memory 46 storing a sequence of programmed instructions, which corresponds to the instruction ROM 36. The controller 44 is adapted to respond to the output signal of the counter 42 so as to transfer the instruction read from the memory 46 as an effective instruction to an instruction register 48 or to modify the instruction read from the memory into a different instruction such as a no-operation instruction, which is fed to the instruction register 48.

Figure 3:
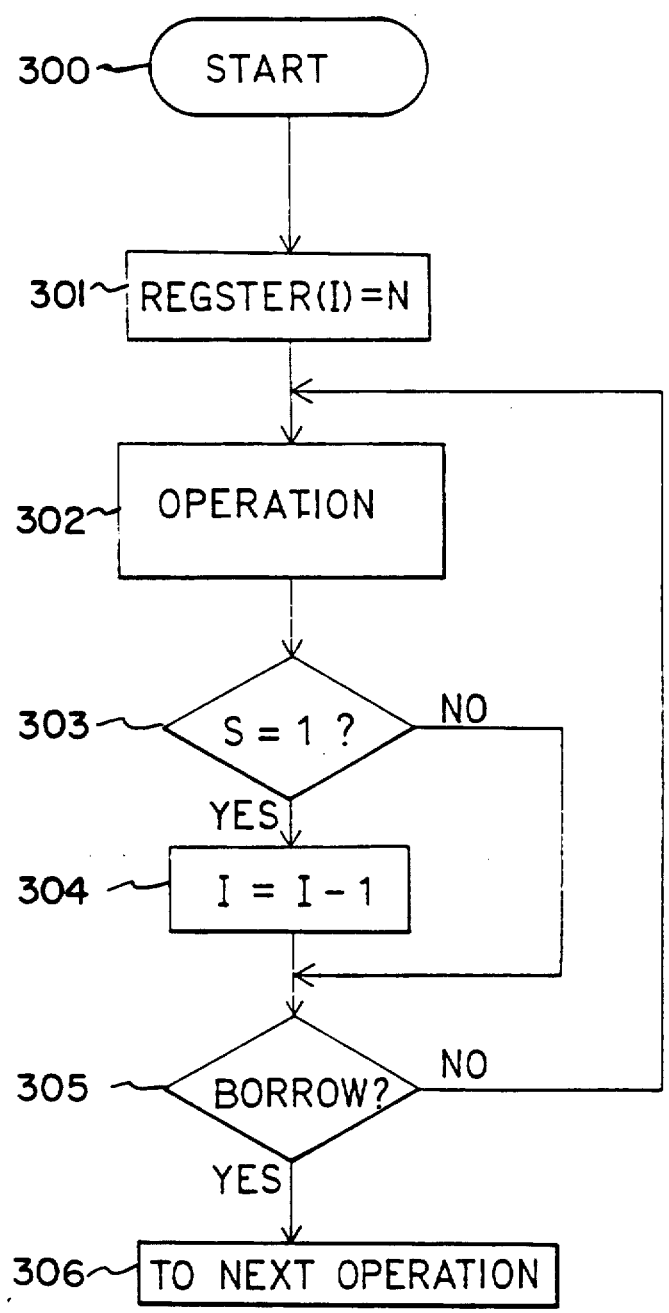
FIG. 3 is a flow chart of an operation executed in the program control circuit shown in FIG. 2.

Operation will be described with reference to the flow chart shown in FIG. 3.

The repetition number of an operation execution is set to the register 40, and then transferred to the counter 42. On the other hand, a sequence of instructions stored in the memory 46 is made such that a signal S is generated when an instruction just before a jump instruction for operation repetition is executed or set in the instruction register 48. Thus, an instruction is sequentially read out from the memory 46 and is transferred through the instruction controller 44 to the instruction register 48 if the counter 42 generates neither a borrow signal nor a carry signal, so that the instruction set in the instruction register 48 is sequentially executed. When instructions excluding the instruction just before the jump instruction are executed, since the signal S is not generated, the value of the counter 42 is maintained as it is. Therefore, neither a borrow signal nor a carry signal is outputted from the counter 42, the instruction is read from the memory 46 and then transferred as it is through the instruction controller 44 to the instruction register 48. But, when the instruction just before the jump instruction is executed, a signal S of a logical level "1" is supplied to the counter 42 so as to decrement the counter 42 in the case that the counter 42 is of the decrement type.

As the result of the decrement of the counter 42, if the counter 42 does not generate a borrow signal, the instruction controller 44 supplies the instruction, i.e., the jump instruction, stored in the memory 46 to the instruction register 48, so that the jump instruction will be executed. In other words, the operation is returned to the repetition sequence including a plurality of instructions. Thus, the operation which has already been executed one time will be executed again. As a result, when the instruction just before the jump instruction is executed again, the signal S is generated again so as to decrement the counter 42.

Such a repeated execution of the same operation is performed until the counter 42 generates a borrow signal. Then, the instruction controller 44 modifies the instruction, i.e., the jump instruction read from the memory to a no-operation instruction, and supplies the no-operation instruction to the instruction register 48. As a result, the jump instruction is not executed, and so, the operation goes out of the repeated operation. Thereafter, an instruction next to the jump instruction is read from the memory 46 and transferred through the instruction controller 44 to the instructions register 48 so that the next instruction will be executed.

If the counter 42 is of the increment type, the counter 42 is incremented in response to the signal S, and until the counter 42 generates a carry signal, the instructions read out of the memory 46 are fed without modification to the instruction register 48, so that, if a jump instruction is contained in the instructions read from the memory 46, an operation will be repeatedly performed in accordance with the jump instruction.

As seen from the above, the instructions to be executed are controlled in accordance with the output (borrow or carry) of the counter 42, so that a repeated operation execution is selectively allowed or inhibited.

As mentioned hereinbefore, the conventional system requires one independent instruction for counting one execution of an operation to be repeated. However, the shown program control circuit makes it possible to concurrently perform the operation of the counter and the execution of the program operation, as seen from the following examples.

For example, a repeated operation will be performed in the conventional system in the following program step sequence:

A-1: set a necessary value to a register A.
A-2: execute a numerical data operation.
A-3: decrement the register A.
A-4: go to the step A-5 if the value of the register A is "0" or to the step A-2 otherwise.
A-5: go to next operation.

As seen from the above, the numerical data operation and the decrement of the register cannot be executed simultaneously, because a specific instruction is required for the decrement of the register A. Further, to carry out the program step A4, there is required a discrimination instruction for determining whether or not the value of the register A is "0". Therefore, one program step is needed for the discrimination instruction. Furthermore, another program step is also required for jumping on the basis of the result of the discrimination.

On the other hand, if the shown program control circuit is used, a repeated operation can be performed in the following program step sequence.

300,301: set a necessary value to a register A (register 40)
302,303,304: execute a numerical data operation, and decrement the value of the register A (counter 42) if the control signal of the register A is "1".
305: go to the step B-4 if a borrow is generated as the result to the decrement or to step B-2 otherwise.
306: go to next operation.

As seen from the above, if the shown program control circuit is used, the length of program steps required for a repeated operation can be shortened by one program step. The conventional system requires one independent instruction for designating the program step A-3. But, in the operation of the shown program control circuit, the control signal S for decrementing the counter 42 needs only one bit. This control signal S can therefore be given by one bit included in an instruction code consisting of a considerable number of bits, while the remaining bits can sufficiently designate one instruction. In other words, the instruction for numerical data operation and the decrement of the register A can be designated by the same one instruction code.

Figure 5:
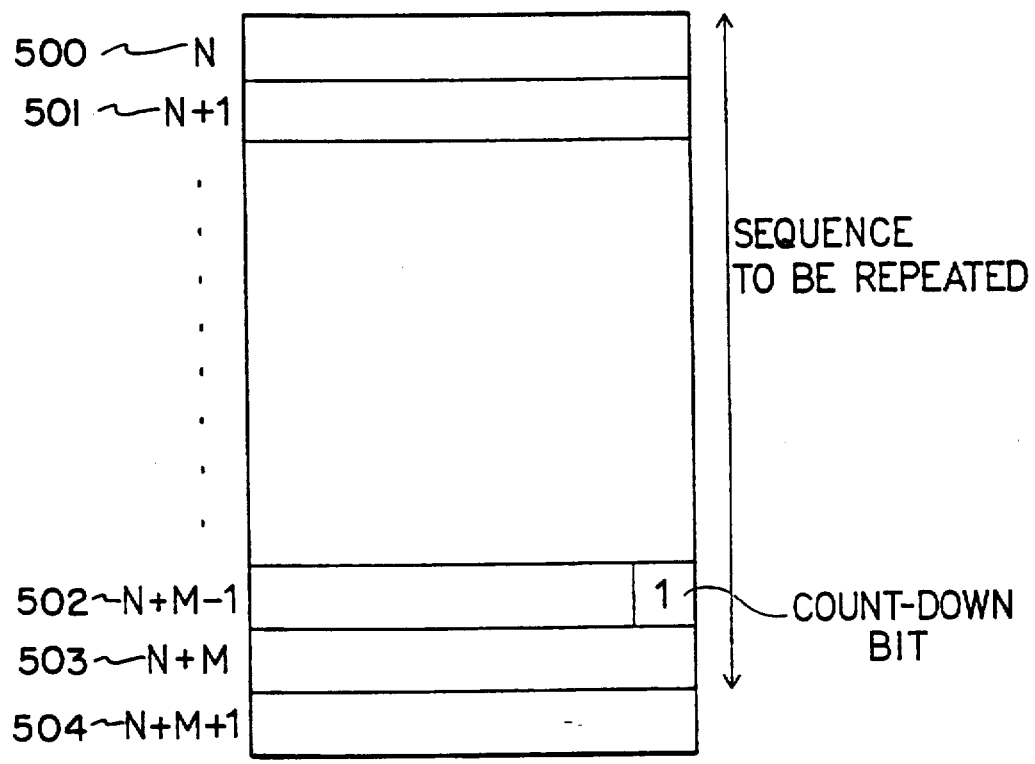
FIG. 5 is a chart showing one example of an instruction stream which can be executed in the present invention.

Specifically, assume that a sequence to be repeated is composed of program steps N (500) to N+M (503) as shown in FIG. 5. In FIG. 5, the program step N+M (503) is a jump instruction going to the program step N. The program step N+M−1 (502) contains a countdown bit of one bit, from which the signal S is generated when the step N+M−1 (503) is executed. Thus, the steps N (500) to N+M (503) is sequentially executed, and when the step N+M−1 (502) is executed, the signal S is generated to decrement the counter 42. If a borrow signal is not generated, the step N+M (503) is executed so that the operation is returned to the step N (500) for repeating the sequence of N (500) to N+M (503). But, if a borrow signal is generated, the jump instruction of the step N+M (503) is modified to a no-operation instruction, so that the operation goes out of a loop for repeatedly executing the sequence N (500) to N+M (503). Here, reviewing the conventional manner, it requires between the steps N+M−1 (502) and N+M (503) one program step for discriminating whether or not the register A is "0". Furthermore, in the step N+M (503) whether or not the jump should be executed is discriminated, and, if necessary, a jump operation is executed in the succeeding step N+M+1 (504).

Thus, the shown program control circuit can decrease the number of the program steps for a repeated operation, and can simplify the discrimination operation and speed up the program operation.

The embodiment shown in FIG. 2 is such that the instruction is modified into the no-operation instruction before it is supplied to the instruction register. But, the instruction can be modified to the no-operation instruction after it is outputted from the instruction register.

Figure 4:
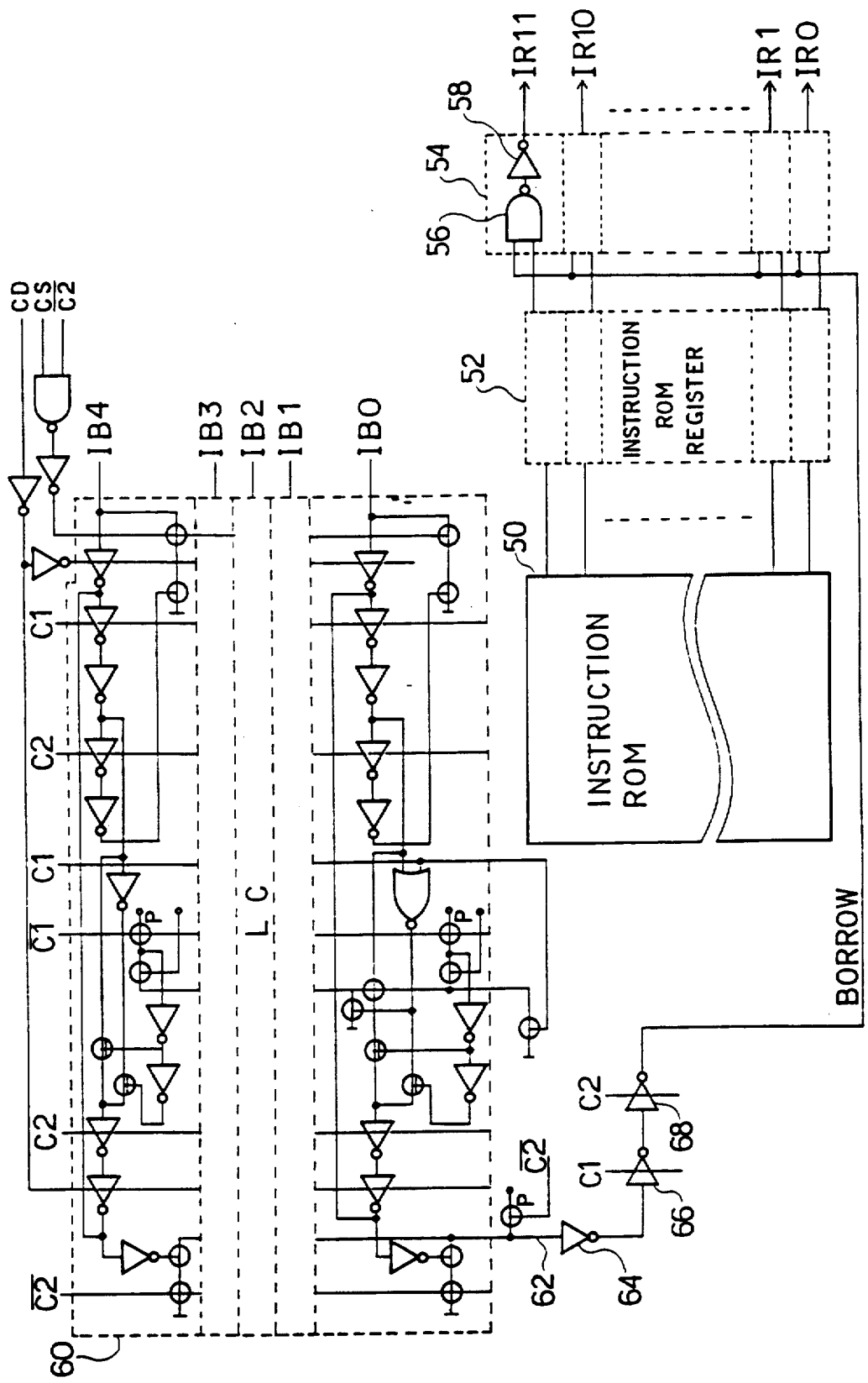
FIG. 4 is a circuit diagram of another embodiment of the program control circuit.

Referring to FIG. 4, there is shown another embodiment of the program control circuit. The shown circuit includes an instruction read only memory (ROM) 50 corresponding to the memory 46. The instruction ROM 50 has 12 bits of outputs, which are connected through an instruction ROM register array 52 to a gate array 54 corresponding to the instructions controller 44. Each gate of the gate arry 54 has a NAND gate having a first input connected to an output of a corresponding register of the register array 52 and a second input connected to receive a borrow signal. An output of the NAND gate 56 is connected through an inverter 58 to a corresponding terminal to instruction terminals IR0–IR11.

Further, the shown circuit includes a 5-bit down counter 60 which receives in parallel the data on an internal bus line IB0–IB4. The counter 60 includes five cascaded one-bit register-counters, each of which contains a plurality of tristates, a plurality of inverters and a plurality of transfer gates connected as shown in FIG. 4. Since the one-bit register-counters excluding that for the least significant bit has the same circuit structure, the circuit structure is shown only on the one-bit register-counter for the most significant bit. The shown counter 60 is adapted so that the data on the bus IB0–IB4 is written into a register portion of the counter in response to a signal CD, and the data stored in the counter is read out to the bus IB0–IB4 in response to the a signal CS. Further, the counter is of the precharge type driven by clocks C1, $\overline{C1}$, C2 and $\overline{C2}$, but is counted down by only the clock C1. The counter 60 has a borrow signal output 62 which is maintained at a logical level "0" as long as at least one of the five register-counters holds "1". Namely, when all the five register-counters become "0", a borrow signal of "1" is outputted, which is fed through one inverter 64 and two tristate inverters 66 and 68 to the gate array 54.

Thus, when the signal CD is applied, the data on the internal bus IB0–IB4 is stored in the register portion of the counter 60. The stored data represents the repetition number of a given operation. When there is executed an instruction just before a jump instruction for operation repetition, the clock C1 is applied to the counter 60. If the counter 60 maintains the borrow signal output 62 at the logical "0", i.e., if a borrow signal is not generated, a high level signal "1" is applied to the NAND gates 56 so that the instruction, i.e., the jump instruction held in the ROM register 52 is outputted to the terminals IR0–IR11 without modification. Therefore, the jump instruction is executed, so that the given operation will be repeatedly executed. But, if the operation repetition is performed the preset times, the borrow signal of "1" is generated by the counter 60 when the instruction just before the jump instruction is executed. As a result, all the output of the gate array 54 becomes "0". In other words, the jump instruction is modified to a no-operation instruction consisting of only "0". Therefore, the jump instruction is not executed, and an instruction just after the jump instruction will be executed.

In the above mentioned embodiment, the no-operation instruction is composed of only "0". But, the no-operation instruction can be in any bit pattern which can inhibit the jump operation and go to the next instruction.

Further, in the embodiment shown in FIG. 4, the inverters 64, 66 and 68 function as a delay circuit. Therefore, the signal S can be generated when there is executed an instruction which is located prior to the jump instruction by the number of program steps corresponding to the delay given by the inverters 64, 66 and 68. Thus, the number of the inverters 64 to 68 can be increased or decreased.

The invention has thus been shown and described with reference to specific embodiments. However, it should be noted that the invention is in no way limited to the details of the illustrated structures but changes and modifications may be made within the scope of the appended claims.

We claim:

1. A program control circuit comprising:
   a register for holding a repetition number of a program operation to be repeated,
   means for modifying content of the register in accordance with each execution of the program operation to be repeated,
   memory means for storing a sequence of instructions, and
   means receiving an instruction read from the memory means for transferring the received instruction without modification in a normal condition and for converting the received instruction into a different instruction when the content of the first register is a predetermined content;
   said modifying means including a counter receiving the content of the register and adapted to change said content in a predetermined counting direction in response to each execution of the operation to be repeatedly executed, the counter generating an output signal when the content of the counter reaches a predetermined value, the transferring and converting means operative in response to the output signal from the counter so as to modify the instruction read from the memory,
   said memory including an instruction read only memory and the transferring and converting means including a gate array coupled to the read only memory, the gate array being placed in a signal blocking condition in response to the output signal of the counter, and wherein said gate array includes a plurality of two-input gates, each gate having a first input connected to a corresponding bit output of the read only memory, a second input of all the gates being connected to receive the output signal from the counter, and
   each gate includes a two-input NAND gate and an invertor connected to an output of the NAND gate.

2. A circuit as claimed in claim 1 wherein the modifying means includes a counter receiving the content of the register and adapted to be decremented in response to each execution of the operation to be repeatedly executed, the transfer means being in response to a borrow signal from the counter so as to modify the instruction read from the memory.

3. A circuit as claimed in claim 1 wherein the modifying means includes a counter receiving the content of the register and adapted to be incremented in response to each execution of the operation to be repeatedly executed, the transfer means being in response to a carry signal from the counter so as to modify the instruction read from the memory.

4. A program control circuit comprising:
   a counter set with a repetition number of a program operation to be repeated and adapted to modify the content of said counter in response with each execution of the program operation to be repeated,
   memory means for storing a sequence of instructions, and
   means receiving an instruction read from the memory means for transferring the received instruction without modification in a normal condition and for converting the received instruction into a different instruction when the content of the first register becomes a predetermined content,
   said counter adapted to change said content in a predetermined counting direction in response to each execution of the operation to be repeatedly executed, the counter generating an output signal when the content of the counter reaches a predetermined value, the transferring and converting means operative in response to the output signal from the counter so as to modify the instruction read from the memory,
   said memory includes an instruction read only memory and the transferring and converting means including a gate array coupled to the read only memory, the gate array being placed in a signal blocking condition in response to the output signal of the counter,
   said gate array including a plurality of two-input gates, each gate having a first input connected to a corresponding bit output of the read only memory and a second input of all the gates being connected to receive the output signal from the counter, and wherein each gate includes a two-input NAND gate and an invertor connected to an output of the NAND gate.

5. A circuit as claimed in claim 4 wherein the counter is adapted to be decremented in response to each execution of the operation to be repeatedly executed, the transfer means being in response to a borrow signal from the counter so as to modify the instruction read from the memory.

6. A circuit as claimed in claim 4 wherein the counter is adapted to be incremented in response to each execution of the operation to be repeatedly executed, the transfer means being in response to a carry signal from the counter so as to modifying the instruction read from the memory.

7. A circuit as claimed in claim 5 wherein the program sequence to be repeatedly executed includes a plurality of instructions and a jump instruction located at the end of the sequence, the program sequence being such that a predetermined instruction located before the jump instruction contains one bit which will generate a signal for decrementing the counter when the predetermined step is executed.

* * * * *